United States Patent [19]
Ester

[11] 3,898,290
[45] Aug. 5, 1975

[54] METHOD FOR THE CATALYTIC HYDRATION OF OLEFINS
[75] Inventor: Wilhelm Ester, Herne, Germany
[73] Assignee: Veba-Chemie Aktiengesellschaft, Gelsenkirchen-Buer, Germany
[22] Filed: Nov. 23, 1971
[21] Appl. No.: 201,586

Related U.S. Application Data
[63] Continuation of Ser. No. 734,840, May 31, 1968, abandoned.

[30] Foreign Application Priority Data
May 30, 1967  Germany.............................. 40803

[52] U.S. Cl.................................. 260/641; 23/289
[51] Int. Cl............................................ C07c 29/08
[58] Field of Search...................................... 260/641

[56] References Cited
UNITED STATES PATENTS
2,421,451   6/1947   Balcar............................ 260/635 A
2,579,601   12/1951  Nelson et al........................ 260/641
2,773,910   12/1956  Schrader............................ 260/641
3,232,997   2/1966   Ester................................ 260/641
3,459,678   8/1969   Hagemeyer et al.................. 260/641
3,704,329   11/1972  Rindtorff et al. .................... 260/641

FOREIGN PATENTS OR APPLICATIONS
1,531,086   5/1968   France............................. 260/641
  470,723   1/1951   Canada............................ 260/641

Primary Examiner—Joseph E. Evans
Attorney, Agent, or Firm—Burgess, Dinklage & Sprung

[57] ABSTRACT
In the vapor phase hydration of olefin to produce the corresponding alcohol employing phosphoric acid as a catalyst, the catalyst being on a catalyst support, wherein liquid phosphoric acid is entrained by the vapor withdrawn from the reaction zone, liquid phosphoric acid is removed from the last-mentioned vapor and returned to the reaction zone.

5 Claims, 2 Drawing Figures 3,898,290
PATENTED AUG 5 1975
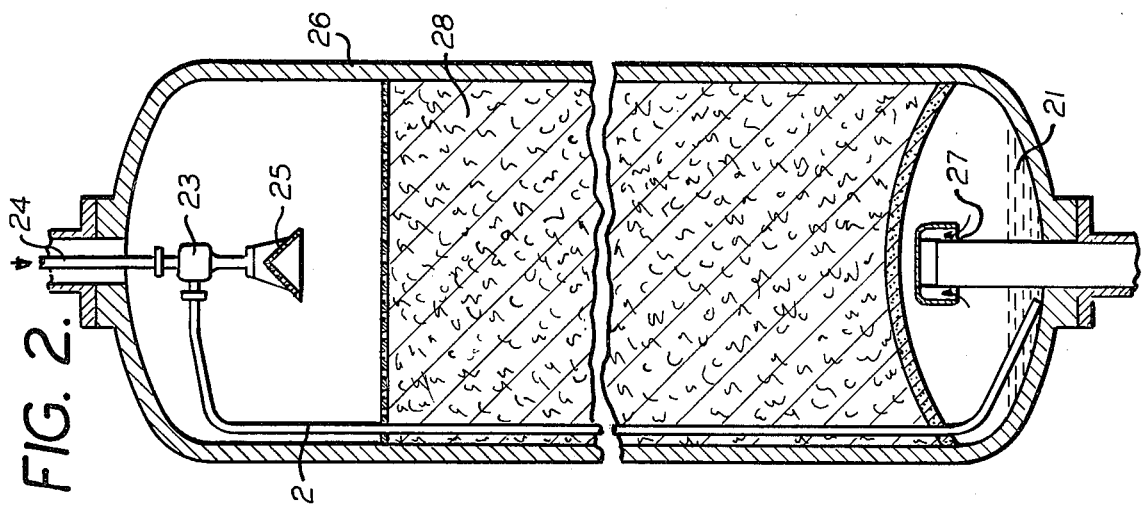
FIG. 2.
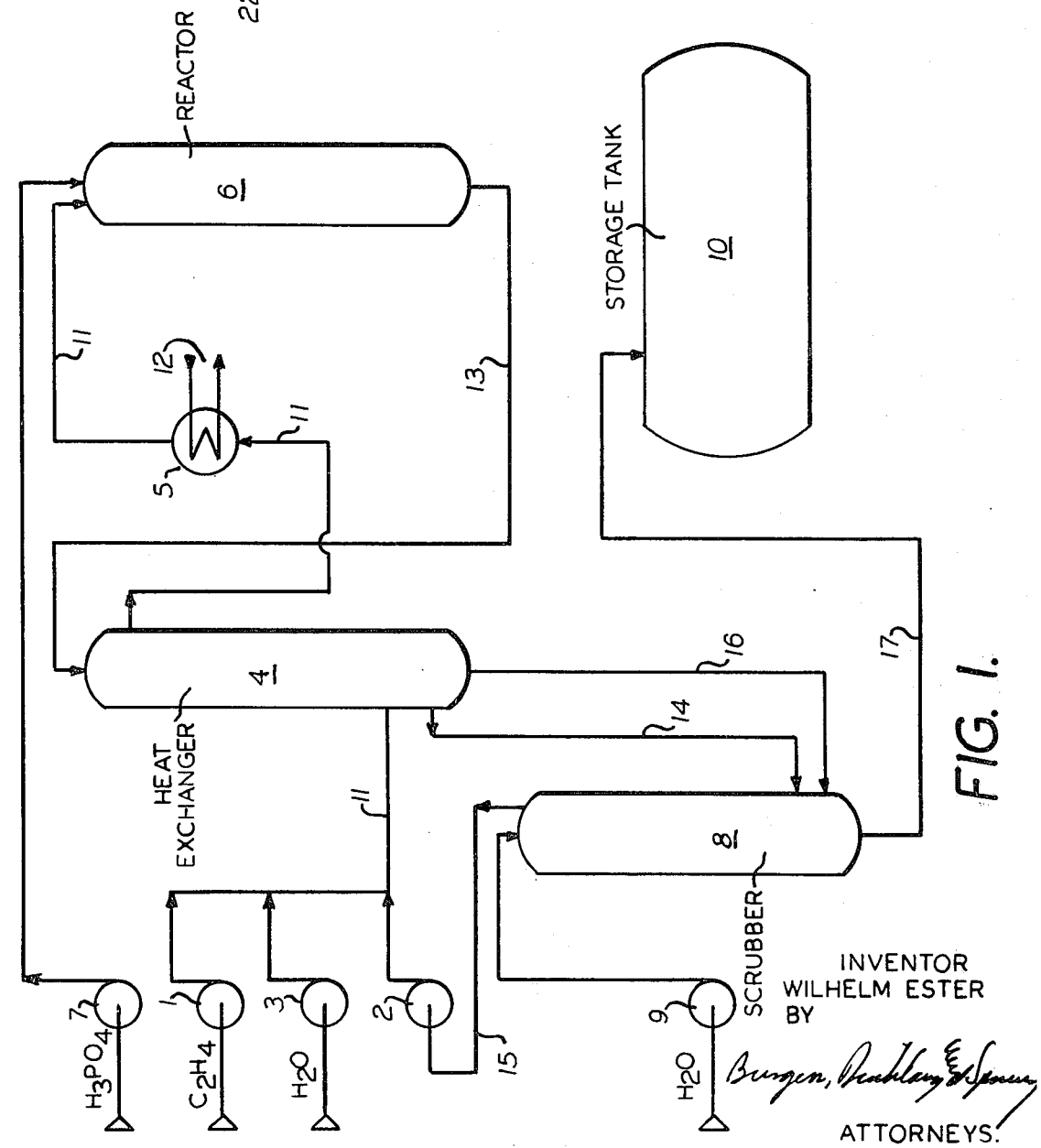
FIG. I.
INVENTOR
WILHELM ESTER
BY
Burgess, Dinklage & Sprung
ATTORNEYS.

METHOD FOR THE CATALYTIC HYDRATION OF OLEFINS

This is a continuation of application Ser. No. 734,840, filed May 31, 1968 now abandoned.

The present invention relates to a method for the hydration of olefins having 2–4 4 C atoms via a catalyst impregnated with phosphoric acid in which the phosphoric acid which is removed in liquid form by the reaction products is separated and collected in a catalyst-free zone of the reactor and then returned again to the catalyst support.

It is known that upon the direct hydration of olefins via a catalyst which is impregnated with phosphoric acid considerable corrosion occurs in the reaction vessel and the subsequent apparatus.

Suitably lining the parts of the apparatus which are subject to corrosion such as contact reactor, subsequent heat exchanger and connecting pipelines, has been attempted. In addition to the use of copper and silver, lining with carbon bricks in accordance with West German Pat. No. 1,136,319 has in particular led to a satisfactory solution within the contact reactor. The pipelines and heat exchanger located behind the contact reactor up to the neutralization equipment were, however, still subject to corrosion.

It has also been proposed to bring the alcohol-containing gaseous product withdrawn from the reactor and which has a strongly acid character to a pH of 6 to 9 by the addition of alkali, in order in this way to prevent corrosion on the metal surfaces coming into contact with the product. Since, however, the addition of the aqueous alkali solution is effected only after a precooling, the parts of the apparatus between the reactor and the condensation apparatus are still subject to strong corrosion, since the phosphoric acid has here a temperature of about 300°C and a concentration of about 85 percent. In accordance with the Dechema Werkstofftabellen, 14th Lieferung, Dec. 1966, section entitled "Phosphoric Acid," practically all metallic materials have only limited resistance to phosphoric acid at these temperatures.

It is furthermore known to subject the catalyst employed to a special pretreatment in order to prevent clogging in the catalyst bed or in the subsequent apparatus produced by the components of the catalyst which are soluble in phosphoric acid.

Furthermore it has been assumed up to now that the phosphoric acid removal cannot be used any longer for the process because of its high aluminum content. By the method of the present invention, it is possible to reuse the phosphoric acid together with its accompanying substances without prior purification without any baking together of the catalyst or detrimental results with regard to activity and life occurring.

The new method is based on the basic principle that the phosphoric acid is separated within a catalyst-free zone of the reactor, and in particular in the lower part of the reactor or in a subsequent container.

The object of the invention is a method for the catalytic hydration of olefins having 2 - 4 C atoms by means of a catalyst impregnated with phosphoric acid, characterized by the fact that the phosphoric acid which is removed by the reaction products in liquid form is separated after leaving the reaction zone and returned to the catalyst support. The separation can be effected for instance, in a zone of the reactor which is free of catalyst or in a subsequent container.

By this measure in accordance with the invention, corrosion of the subsequent apparatus and pipelines by liquid phosphoric acid as well as coating of the heat-exchange surfaces with the soluble parts of the catalyst contained in the phosphoric acid is extensively excluded. Furthermore there is obtained a reduction in the consumption of phosphoric acid.

The phosphoric acid which is entrained in accordance with the partial pressure causes practically no corrosion in the subsequent apparatus, since it is below the saturation point.

By the method of the invention, however, there is not only avoided any corrosion of the apparatus but, in addition, it is thus also possible to use a higher aluminum content in the catalyst, e.g. an $Al_2O_3$ content of more than 10 percent. A prior treatment of the catalyst or strong reduction of the aluminum content in accordance with German Provisional Pat. No. 1,156,772 is therefore not absolutely necessary for the present process. When the new process is used, one can employ catalyst supports which, in addition to $SiO_2$, contain also up to 25 percent of other oxides such as $Al_2O_3$, $Fe_2O_3$, $TiO_2$, etc., and in all cases there is definitely avoided any deposit on the following apparatus. All customary hydration catalyst can be employed, for instance, aluminum silicates having a gase of diatomaceous earth or bentonite.

The object of the present invention is achieved in a particularly favorable manner by pumping the separated phosphoric acid back directly within the catalyst space onto the catalyst.

In practice, the hot phosphoric acid containing dissolved portions which has collected in the lower contact part of the reactor can be recycled or discharged to the outside only with difficulty by means of pumps, valves and pipelines, since there is an absence of cheap materials which will under these conditions assure dependable operation for long periods of time. The manner of recycling the phosphoric acid selected here therefore contemplates a pipeline of, for instance, carbon-containing material which is located within the contact reactor, which pipeline need only have a low compressive strength. As means for the conveying of the phosphoric acid there is preferably employed an injector with which, as propellent material, a small part of the fresh gas compressed up to about 10 atm. above operating pressure or a corresponding part of the recycled gas can be used. The recycled phosphoric acid acts so advantageously in the upper gas space that a uniform spraying of the entire surface is obtained.

Of course, it is also possible to effect the recycling of the phosphoric acid by means of a pressure-proof pipeline which is located outside the contact reactor.

If it is desired to remove all or part of the separated phosphoric acid out of the system, this is to be sure requires a greater technical expenditure, since difficulties occur with respect to the material for the necessary shutoff members. The withdrawal of the phosphoric acid can be effected both continuously and intermittently. The phosphoric acid separated in this manner can accordingly either be returned to the catalyst without purification or after separation of the impurities or else be used for other purposes.

The invention is further described in the accompanying drawings, wherein:

FIG. 1 is a flow sheet for the process of the invention; and

FIG. 2 is a showing of an embodiment of a reactor according to the invention.

FIG. 2 schematically shows the contact reactor 26 with the separating device 27. The separating device 27 is established in accordance with the principles which apply to separators, i.e., low velocities of flow in the separator space and means for the agglomerating of the fine mist. The following construction was selected:

Out of carbon bricks there is made an arch which adjoins the point of transition from the cylindrical part of the contact reactor to the bottom. The carbon bricks used are provided with slots of an inside size of about 7 mm which widen in the direction of the flow of the gas to about 12 mm. The arch is first of all covered with a layer of a thickness of 100 of carbon beads of a diameter of 12 mm and then with a layer of a thickness of 100 mm of carbon beads of a diameter of 8 mm, and finally with another layer of a thickness of 100 mm of beads of the same material of a diameter of 6 mm in order to prevent the catalyst support sliding out through the separator bottom. The withdrawal tube at the lower part of the contact reactor is extended into the separator space by a carbon tube of a length of about 450 mm so that the phosphoric acid can build up only to at most this height. The phosphoric acid which drips just above the tube through the separator bottom is led off to the side by a protective roof. At the lowest point in the separator space, the carbon tube terminates with an inside diameter of 12 mm for the discharge of the phosphoric acid 21 to the injector 23 via distributor 25 to the catalyst bed 28. Ethylene is pumped in via the conduit 24. By this construction, degrees of separation of more than 90 percent are obtained. The injector can also be placed at the lower end of the carbon tube.

If the phosphoric acid which has been separated and collected is to be discharged first of all to the outside, then the pipeline 22 and the injector 23 are done away with. The withdrawal devices and valves required for this measure are not shown in FIG. 2.

The following examples, as well as FIG. 1 and FIG. 2, are intended to explain the process in further detail. Example 1 and FIG. 1 show a normal method of operation without separation or return of the phosphoric acid; Example 2 and FIG. 2 relate to the method of the invention. In Example 3 in one catalyst pretreated in accordance with German Provisional Pat. No. 1,156,772 and in the other case catalysts whose aluminum content has not been reduced are employed for the method of the invention.

EXAMPLE 1 (NORMAL METHOD OF OPERATION)

In an operating system (see FIG. 1), 40,000 cubic meters (STP) of 85 percent ethylene are pumped by means of the circulating compressor 2 via the line 11 together with 23 tons of water 3 at a pressure of 70 atm. ga. over heat exchangers 4 and the preheater 5 to the contact reactor 6. The reaction mixture is heated in the heat exchangers 4 by the reaction products leaving the contact reactor via the conduit 13. The reaction mixture, before entering the contact reactor, is heated in the preheater 5 to a temperature of 256°C by saturated steam 12. Together with the reactants, 8 kg/hr of 85 percent phosphoric acid 7 are introduced into the contact reactor 6 which is filled with 55 cubic meters of catalyst. As catalyst support, the bentonite-containing contact substance K 3065 manufactured by Südchemie, Germany, was used which was leached out and impregnated with phosphoric acid in the manner described in German Provisional Pat. No. 1,156,772. The conversion on the catalyst is 2,100 cubic meters (STP) pure ethylene per hour, which were replaced via 1. After a cooling in the heat exchangers 4 of the reaction products leaving the contact reactor 6 via the conduit 13 and removal of the condensed liquid via the conduit 16, the gas is fed via the conduit 14 to the scrubber 8, where, by scrubbing in counter-current with 5.4 tons of water 9, it is freed of the remaining alcohol. The ethylene which leaves the scrubber via the conduit 15 is returned to the system by the recycle compressor 2 via the line 11. The diluted alcohol collecting in the liquid phase of the scrubber 8 is fed via line 17 to the storage tank 10 and from there to the distillation. The total amount of dilute alcohol obtained in 31 tons/hr; the alcohol concentration is 13.4 percent by weight, and the content of phosphoric acid is 220 mg/kg of dilute alcohol. The yield, referred to the reacted ethylene, is 95.6 percent.

EXAMPLE 2 (METHOD ACCORDING TO THE INVENTION)

The phosphoric acid (see FIG. 2) 21 collecting in the bottom of the contact reactor 26 at the lowest point of the built-in separating device 27 is returned directly in the following manner within the catalyst space to the top of the catalyst:

Through the conduit 24 50 cubic meters (STP) of ethylene are pumped per hour with a pressure of 74 atm.ga. (the pressure in the content reactor is 70 atm.ga.) through the injector 23 into the contact reactor 26. The phosphoric acid collecting in 21 is drawn in through the conduit 22 and sprayed through the injector 23 via a distributor 25 onto the catalyst bed 28. In addition, by means of a pump, 1.1 kg/hr of 85 percent phosphoric acid are pumped onto the support. The other operating conditions are the same as in Example 1.

After 1 year's operation with the recycling onto the catalyst bed of the separated phosphoric acid, no difference in the catalyst activity was noted as compared with a vehicle in which, as described in Example 1, the phosphoric acid removed is replaced by fresh phosphoric acid. The dilute alcohol obtained in the liquid phase of the scrubber 8 (see FIG. 1) has the following composition:

|  | Without (see Example 1) | With (see Example 2) |  |
|---|---|---|---|
|  | Phosphoric Acid Recycle | | |
| Ethanol | 13.4 | 13.5 | % by wt. |
| Ether | 0.094 | 0.096 | % by wt. |
| Acetaldehyde | 0.013 | 0.010 | % by wt. |
| Fusel oils | 0.046 | 0.050 | % by wt. |
| Hydrocarbons | 0.015 | 0.013 | % by wt. |
| Phosphoric acid | 220 | 29 | mg/kg |
| $SiO_2$ | 3.0 | 0.35 | mg/kg |
| $Al_2O_3$ | 0.074 | 0.008 | mg/kg |
| $Fe_2O_3$ | 0.035 | 0.004 | mg/kg |

EXAMPLE 3

In the system described in Example 2, two different catalysts were used, namely:

a. A catalyst designated K 3065 produced by Sudchemie, Germany, which is thereupon impregnated with phosphoric acid, b. The catalyst obtained from said K 3065 by leaching with hydrochloric acid and impregnating with phosphoric acid in accordance with German Provisional Pat. No. 1,156,772.

The properties are summarized in the following table:

|  | a<br>K 3065<br>Crude<br>Contact | b<br>K 3065<br>Leached in accordance<br>with German Provisional<br>Patent 1,156,772 |
| --- | --- | --- |
| Inner surface m³/g | 230 | 185 |
| Pore volume ml/g | 0.411 | 0.685 |
| Bulk weight g/l | 656 | 518 |
| Compressive strength kg/bead | 7.9 | 5.1 |
| Analysis |  |  |
| $SiO_2$ | 68.95 % | 91.41 % |
| $Al_2O_3$ | 17.82 % | 3.98 % |
| $Fe_2O_3$ | 3.92 % | 0.42 % |
| CaO | 0.23 % | traces |
| MgO | 1.05 % | traces |
| Firing loss | 8.44 % | 4.40 % |

After impregnation with 70 percent $H_3PO_4$ and drying as in German Provisional Pat. No. 1,156,772, the following $H_3PO_4$ concentration results:

32.00 %   38.30 %

The two tests were carried out with the use of the recycle, described in Example 2, of the phosphoric acid collecting in the separator, to the support.

The tests gave the following results:

|  | a | b |
| --- | --- | --- |
| Conversion of ethylene per hour | 1,850 cubic meters (STP) | 2,100 cubic meters (STP) |
| Yield | 94.9% | 95.6% |
| Ethanol concentration in the dilute alcohol | 11.9% by wt. | 13.4% by wt. |
| mg phosphoric acid/kg | 32 | 30 |
| mg $SiO_2$/kg | 3.02 | 0.33 |
| mg $Al_2O_3$/kg | 0.15 | 0.009 |
| mg $Fe_2O_3$/kg | 0.02 | 0.004 |

The pressure loss in the contact reactor in both experiments is 0.75 atm. after a period of operation of 3 months. with the use of the catalyst pretreated in accordance with German Provisional Pat. No. 1,156,772, excellent yields are obtained, while with the use of the raw catalyst, good yields are obtained.

What is claimed is:

1. In the hydration of an olefin having 2–4 carbon atoms to produce the corresponding alcohol, which comprises:

a. in a reaction zone contacting a gas phase mixture of olefin and water vapor at elevated pressure and at olefin hydration temperatures whereby an alcohol is produced with liquid phosphoric acid as catalyst which liquid phosphoric acid is impregnated within a catalyst support, under conditions wherein liquid phosphoric acid drips from the catalyst, b. removing a gas phase mixture of alcohol and water vapor entraining liquid phosphoric acid from the reaction zone, the improvement which comprises:

c. in a separating zone free of catalyst support, separating the liquid phosphoric acid from the gas phase mixture removed from the reaction zone and recycling the phosphoric acid to the catalyst support in the reaction zone, d. the reaction zone and separating zone being within a common vessel with the reaction zone disposed over the separating zone, e. conveying the phosphoric acid separated in the separating zone through a carbon conduit disposed within the vessel to the catalyst support in the reaction zone.

2. Process according to claim 1, said catalyst support having a base of aluminum silicate.

3. Process according to claim 2, the catalyst support having an $Al_2O_3$ content of less than 10 percent.

4. Process according to 1, wherein the phosphoric acid is pumped through the conduit by a jet of at least part of said gas phase mixture directed into the reaction zone.

5. A process according to claim 1 wherein the phosphoric acid separated in the separated zone is returned through said carbon conduit and disposed in an upper gas space over the reaction zone containing the catalyst support where it falls downwardly onto the catalyst support maintained in said reaction zone.

* * * * *